(No Model.)
G. & R. J. BOGUSCH.
A. ZINCKE, Administrator of R. J. BOGUSCH, Deceased.
EXTENSIBLE TRESTLE.
No. 418,938. Patented Jan. 7, 1890.
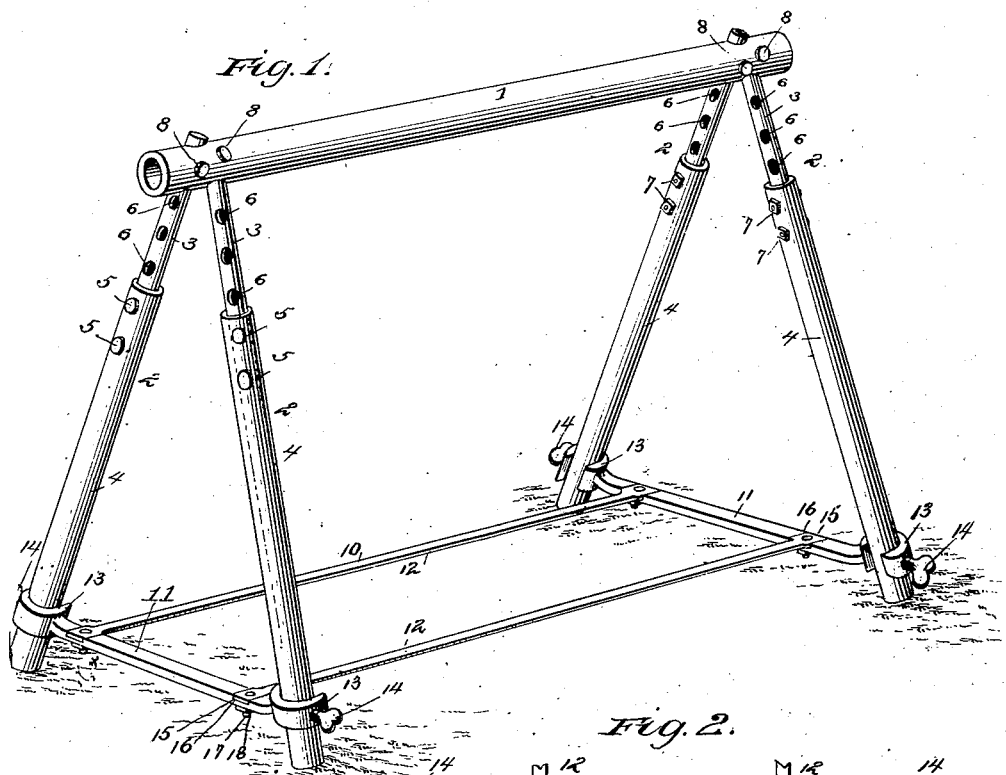
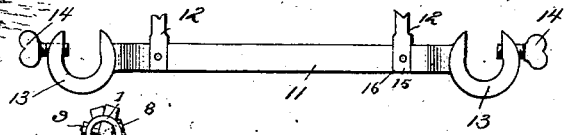
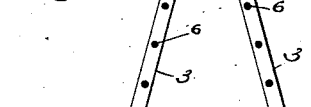
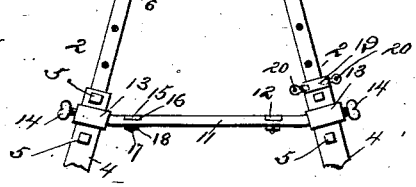
WITNESSES:
INVENTOR:
G. Bogusch
A. Zincke Administrator
BY Estate of R. J. Bogusch
ATTORNEYS.

UNITED STATES PATENT OFFICE.

GUSTAV BOGUSCH, OF VALLECILLO, MEXICO, AND AUGUST ZINCKE, OF LLANO, TEXAS, ADMINISTRATOR OF ROBERT J. BOGUSCH, DECEASED.

EXTENSIBLE TRESTLE.

SPECIFICATION forming part of Letters Patent No. 418,938, dated January 7, 1890.

Application filed June 15, 1889. Serial No. 314,377. (No model.)

*To all whom it may concern:*

Be it known that ROBERT J. BOGUSCH, deceased, late of Vallecillo, Mexico, and GUSTAV BOGUSCH, of Vallecillo, Nuevo Leon, Mexico, invented a new and Improved Extensible Trestle, of which the following is a full, clear, and exact description.

This invention relates to trestles for masons and carpenters, for scaffolding and other uses, and has for its object to provide a trestle which will be light, strong, and simple in construction, may be easily put together and taken apart, and may be elevated.

The invention consists in an extensible trestle constructed and arranged as hereinafter described and claimed.

Reference is to be had to the accompanying drawings, forming a part of this specification, in which similar figures of reference indicate corresponding parts in all the views.

Figure 1 is a perspective view of the invention in unextended position for use. Fig. 2 is a portion thereof detached with parts broken away; and Fig. 3 is an end view of the trestle with lower portion of legs broken away.

In carrying out the invention the trestle is constructed with a cross-beam, extensible legs, and a brace or stay frame, the several parts being detachable, so as to be taken apart and compactly folded together for transportation or storage. The trestle is preferably made of iron for strength, and the cross-beam and legs of piping to secure lightness.

1 indicates the cross-beam, preferably in the form of a tube of any desired length, and 2 the extensible tubular legs, formed in two parts 3 and 4, the parts 3 movable in the parts 4, and preferably adjustably held in extended or closed position by means of bolts 5, passing through holes in the upper ends of parts 4 and a series of holes 6 in the parts 3 and secured by nuts 7. The parts 3 and 4 may be held by any other suitable form of pin or bolt. The upper ends of the legs project through holes in the cross-beam 1, and are secured thereto, preferably by means of bolts 8, extending through holes in the cross-beam 1 and parts 3 of the legs and secured by nuts 9. In order to stay or brace the legs 2, a brace-frame 10 is provided, consisting of the cross-bars 11, connected by the longitudinal bars 12. The cross-bars 11 are preferably connected to the legs 2 by the hook-shaped ends 13, adapted to partly encircle the parts 4 of legs 2 and be held thereon by thumb-screws 14. The longitudinal bars 12 are formed with enlarged ends 15, which set into recess 16 in the cross-bars 11, and are detachably secured to the latter by bolts 17 and nuts 18. If desired, the longitudinal bars 12 may be dispensed with; but they are preferably employed to give greater steadiness to the trestle and to brace the legs lengthwise.

When the trestle is used with the legs unextended, as shown in Fig. 1, the cross-bars 11 extend between and brace the lower ends of the legs, and when the legs are extended the cross-bars 11 extend between and brace the upper ends of the lower parts 4 of the legs 2. If desired, the cross-bars 11 may be formed so as to be extensible and fixed at any height on the legs; but the form shown is preferred as being simpler and substantially securing as good results as if extensible.

In lieu of bolts 5, nuts 7, and holes 6, a collar 19, movable on part 3 of legs 2 and held by thumb-screws 20, as shown in Fig. 3, may be employed to hold the parts 3 and 4 of legs 2.

By means of this invention a simple, effective, and durable trestle is provided.

Having thus described the invention, what is claimed as new, and desired to be secure by Letters Patent, is—

1. In a trestle, the brace-frame 10, having parallel connected end bars 11, provided with hook-shaped ends 13, having set-screws 14, substantially as set forth.

2. A trestle comprising a cross-bar, outward-inclined legs at the ends thereof, and the brace-frame 10, consisting in the connected end bars 11, having hooked ends 13, engaging the said legs, and set-screws 14, extending through said hooks to clamp them to the legs, substantially as set forth.

3. A trestle consisting of the cross-beam 1, the extensible legs 2, formed of the part 4 and the part 3, with holes 6, movable in part 4, secured in adjusted position by bolts 5 and nuts 7, and also secured to cross-beam 1 by bolts 8 and nuts 9, and the brace-frame 10, consisting of cross-bars 11, with hook-shaped ends 13, engaging legs 2 and held by thumb-screws 14, and longitudinal bars 12, secured to bars 11 by bolts 17 and nuts 18, substantially as shown and described.

4. In a trestle, the cross-beam 1, legs 2, with extensible portions 3, engaging cross-beam 1, with means for adjustably securing the legs in extended position, and cross-bars 11, having hook-shaped ends 13, engaging legs 2 and held by thumb-screws 14, substantially as shown and described.

GUSTAV BOGUSCH.
AUGUST ZINCKE,
*Administrator of the estate of Robert J. Bogusch, deceased.*

Witnesses to the signature of Gustav Bogusch:
    E. W. BOGUSCH,
    WILLIAM DONALD.

Witnesses to the signature of August Zincke:
    WM. MATHEWS,
    T. J. WATKINS.